United States Patent [19]
Käszmann et al.

[11] Patent Number: 5,266,978
[45] Date of Patent: Nov. 30, 1993

[54] SPECTACLE FRAME

[75] Inventors: Herbert Käszmann, Heidenheim; Hermann Steeb, Heubach, both of Fed. Rep. of Germany

[73] Assignee: Ferdinand Menrad GmbH & Co. KG, Schwabisch Gmund, Fed. Rep. of Germany

[21] Appl. No.: 721,475
[22] PCT Filed: Oct. 26, 1990
[86] PCT No.: PCT/EP90/01918
 § 371 Date: Aug. 26, 1991
 § 102(e) Date: Aug. 26, 1991
[87] PCT Pub. No.: WO91/06885
 PCT Pub. Date: May 16, 1991

[30] Foreign Application Priority Data
Oct. 26, 1989 [DE] Fed. Rep. of Germany ....... 3935599
Jun. 15, 1990 [DE] Fed. Rep. of Germany ....... 4019085

[51] Int. Cl.$^5$ ................................. G02C 1/00
[52] U.S. Cl. ........................... 351/87; 351/136; 351/139; 2/446
[58] Field of Search ............... 351/136, 139, 132, 87, 351/88, 76, 82; 2/446

[56] References Cited
U.S. PATENT DOCUMENTS
4,375,911 3/1983 Bononi ................................ 351/122
4,802,754 2/1989 Neef ..................................... 351/138

FOREIGN PATENT DOCUMENTS
042712 12/1981 European Pat. Off. .
2613151 10/1977 Fed. Rep. of Germany .
7919173 1/1980 Fed. Rep. of Germany .
7916275 11/1980 Fed. Rep. of Germany .
3319827 12/1984 Fed. Rep. of Germany .
7603527 8/1977 France .

Primary Examiner—Bruce Y. Arnold
Assistant Examiner—Hung Xuan Dang
Attorney, Agent, or Firm—Helfgott & Karas

[57] ABSTRACT

Non-slip assembly of a spectacle frame made of synthetic material includes two silicone elements filling two respective depressions formed at two nose pads of the spectacle frame. Each silicone element is rigidly held in the respective depression as a viscous silicone is cured. Each silicon element is flush with an edge of the respective depression.

8 Claims, 1 Drawing Sheet

SPECTACLE FRAME

BACKGROUND OF THE INVENTION

The subject matter of this invention concerns a spectacle frame consisting of a synthetic material with an adhesive coating made of silicone on a portion of its surface, with a primer coating between the adhesive coating and the surface of the spectacle frame serving as a bonding layer.

When spectacle frames made of synthetic materials and having a smooth surface slip are worn or handled, they are very slippery, especially as a result of perspiration, grease, cream, or similar things. It is particularly annoying when the glasses slip downward or sideways whenever the wearer moves his/her the head.

To improve the fit of glasses, German Utility-Model Patent No. 7,916,275 provides for coating the surface of the spectacle frame, to the extent that it comes into contact with the skin, with an adhesive coating of silicone. This silicone film, which is applied onto a primer coating, is very thin and wears off very rapidly.

SUMMARY OF THE INVENTION

Thus, it is the objective of this invention to create a synthetic spectacle frame with good and long-lasting adhesive properties, which will eliminate the possibility that the glasses slip down the nose, which can be extremely annoying to the wearer.

This problem is solved according to this invention by providing flat silicone elements at least in the area of the two pads (lateral nose supports of the spectacle frame) which are held in a depression of the spectacle frame so as to be flush with the edge. The silicone element is formed by filling silicone into a depression of the spectacle frame until this depression is full to the brim.

Wear tests with this type of glasses have confirmed the suitability of the silicone element as a solution of the problem defined above as well as its extraordinarily long durability. Special investigations as to sensitivity to perspiration, allergies and adhesive strength invariably yielded positive results. It proved to be sufficient to limit application of the adhesive coating to the two nose pads of the spectacle frame.

After molding the depression into the spectacle frame, a primer coating is applied. Only then is the depression filled to the brim with viscous silicone until the silicone, due to its surface tension, forms a slight curvature toward the outside. As a result of the flush design of the silicone element, which is further improved by an edged beading which surrounds the depression, the silicone element is protected against mechanical damage, e.g., scratches. Also, the possibility of a partial separation of the silicone element is avoided.

The attached drawing illustrates one particular practical example of this invention.

DETAILED DESCRIPTION OF THE PREFERRED EMBODIMENTS

Figure 1:
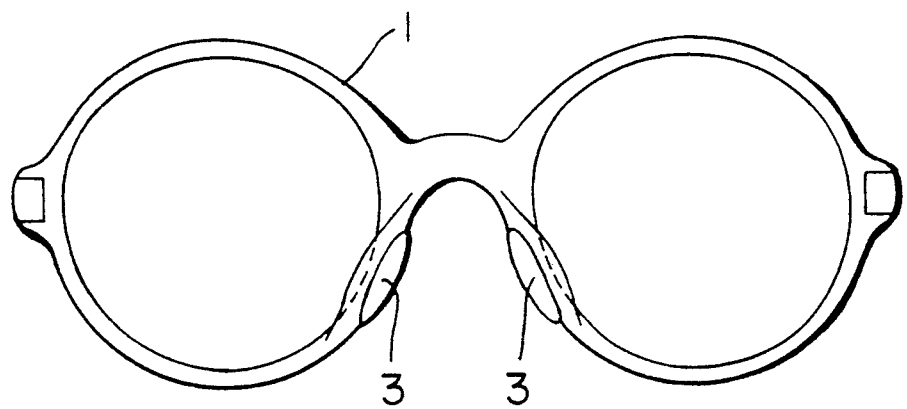
FIG. 1 shows the front of a spectacle frame on the inside as seen by the wearer.

In the view of spectacle frame 1 from the inside as shown in FIG. 1, the two silicone elements 3 which form the nose pads of the frame are shown.

Figure 3:
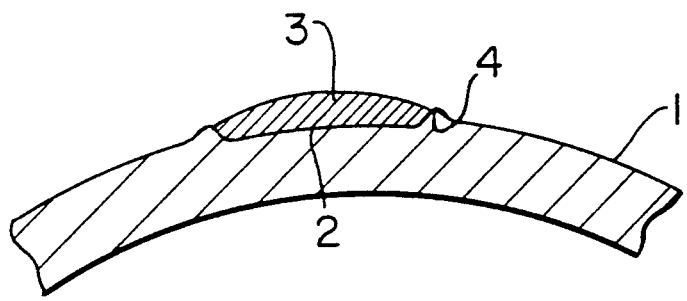
FIG. 3 shows a longitudinal cross section through the nose pad along line III—III of FIG. 2.
Figure 2:
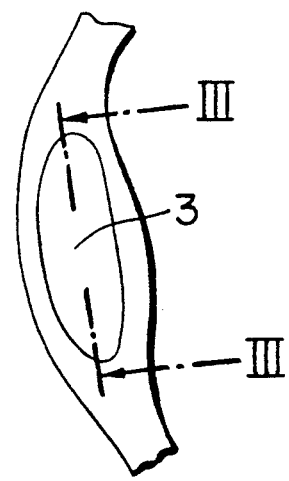
FIG. 2 shows a top view of a nose pad of the spectacle frame.

FIGS. 2 and 3 show an enlarged representation of the nose pad area of spectacle frame 1. After cleaning depression 2 with alcohol and allowing it to dry, a primer coating (not shown in the drawing) is applied with a brush to depression 2 which, for this purpose, is held in an approximately horizontal position. After the primer coating is dry, silicone element 3 is produced, preferably by means of a cannula, by filling depression 2 to the brim [with silicone]. Subsequently, the viscous silicone is allowed to cure at room temperature.

The silicone may, of course, also be applied by means of a metering device. The convex form of the silicone element 3 depends on the viscosity of the silicone used and is thus controllable. The application area is defined by depression 2 and its edged beading 4. This edged beading results from a material displacement during the molding of depression 2 by means of a metal punch at a temperature of 100° C. to 150° C.

In the context of this invention, it is also plausible to use a type of material other than silicone. Like silicone, this material should have suitable adhesive properties, it should preferably be transparent, it should have similar antislip properties, and it should be easy to apply, such as silicone rubber. Presently, especially cold-curing silicone rubber mixtures which polymerize slowly at room temperature under the influence of humidity should be taken into consideration.

We claim:

1. Spectacle frame of a synthetic material, comprising two nose pads, wherein in the area of the two nose pads of the spectacle frame two depressions are formed having surfaces thereof coated with a bonding layer of a primer coating, and wherein two flat silicone elements are respectively provided in said depressions, each silicone element having a flat surface facing the respective depression, said silicone elements being obtained by filling curable, viscous silicone into said depressions until each depression is filled to a brim, and each of said silicone elements is integrally held in the respective depression so as to be flush with an edge thereof, and wherein each depression is surrounded by an edged beading which is produced while the depression is molded in the frame.

2. Spectacle frame according to claim 1, wherein each depression in the spectacle frame is produced by hot forming.

3. Spectacle frame according to claim 1, wherein each silicone element has an approximately lenticular shape and a slightly convex surface.

4. Spectacle frame according to claim 1, wherein an adhesive coating is provided between said bonding layer and each silicone element.

5. A method for the production of a spectacle frame of a synthetic material and comprising two nose pads, the method comprising the steps of forming two depressions in the frame at said nose pads, coating surfaces of said depressions with a primer layer and filling each of said depressions with viscous, curable silicone material to a brim thereof so as to form flat silicone elements integrally held in said depressions when said silicone material is cured, wherein an edged beading surrounding each depression is formed when the depression is molded into the frame.

6. Method according to claim 5, further comprising the step of providing an adhesive coating between said primer layer and said silicone material.

7. Method according to claim 5, wherein depression in the spectacle frame is produced by hot forming.

8. Method according to claim 5, wherein the silicone material is filled into each depression in such an amount that the silicone element emerging from the cured silicone material has an approximately lenticular shape and a slightly convex surface.

* * * * *